Patented Sept. 28, 1943

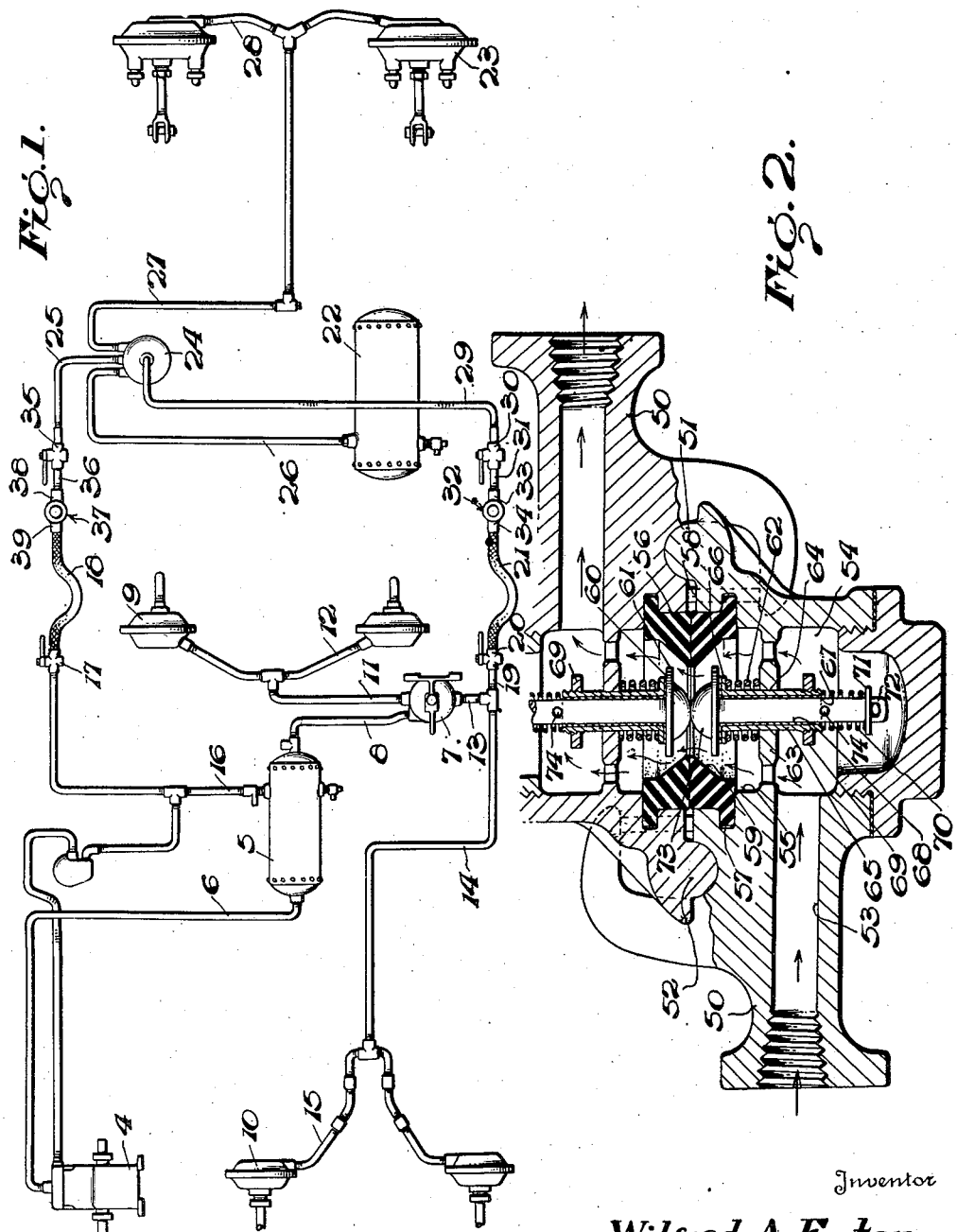

2,330,413

UNITED STATES PATENT OFFICE 2,330,413

FLUID COUPLING

Wilfred A. Eaton, Elyria, Ohio, assignor to Bendix-Westinghouse Automotive Air Brake Company, Elyria, Ohio, a corporation of Delaware Application March 2, 1942, Serial No. 433,073

11 Claims. (Cl. 284—10)

This invention relates to braking systems for tractor and trailer vehicle trains and more particularly to means for coupling the brake system of a tractor vehicle to that of a trailer vehicle.

It has been customary in connection with fluid pressure brake systems installed on tractor-trailer trains to conduct the supply of fluid pressure from one vehicle to the other by means of a flexible hose, connected to at least one of the vehicles by means of a readily detachable coupling so that, on uncoupling of the vehicles, the operator could at the same time uncouple the hose line. In view of the fact that such hose couplings of the detachable type necessarily have an outlet port, it has frequently happened that, after the vehicles were upcoupled, dirt or other foreign substances entered the outlet port of the hose coupling and was, on subsequent re-coupling of the vehicles, carried through the lines of the trailer by the flow of fluid pressure from the tractor brake system with resultant damage to the control valve and other fluid pressure mechanism on the trailer.

It is accordingly an object of the present invention to provide novel means for coupling the fluid pressure control lines of tractor and trailer vehicles so constituted as to prevent the entrance of dirt or other foreign substance into the interior of the couplings during the time they are disconnected.

Another object of the invention is to provide closure means for such couplings so arranged as to be automatically operable to establish a fluid pressure connection between the coupling members when the members are coupled together.

Yet another object of the invention is to provide a detachable coupling device for fluid pressure lines having means for preventing the entrance of dirt to the coupling members when uncoupled and for permitting the passage of fluid when coupled, this means being actuated by the act of mechanically locking the coupling members together.

A further object of the invention is to provide a novel and efficient hose coupling so constituted as to prevent the entrance of dirt to the interior of the coupling when the coupling is disconnected without acting to prevent the escape of fluid pressure from the coupling in the event of accidental disconnection of the coupling.

Still another object of the invention is to provide dirt excluder means for detachable hose couplings in a fluid pressure brake system so arranged as to permit the proper operation of the braking system with the couplings in either connected or disconnected position.

These and other novel features of the invention will be more fully understood from the following detailed description when taken in connection with the accompanying drawing. It is to be expressly understood, however, that the drawing is utilized for purposes of illustration only and is not to be taken as a definition of the limits of the invention, reference being had for such purpose to the appended claims.

Referring to the drawing, wherein similar reference and numerals refer to like parts throughout the several views:

Fig. 1 is a diagrammatic view showing the elements of a tractor-trailer fluid pressure braking system equipped with hose couplings of the type above referred to, and Fig. 2 is an enlarged sectional fragmentary view of the hose coupling members.

Referring more particularly to Fig. 1 of the drawing, a tractor-trailer fluid pressure brake system is disclosed therein, wherein a fluid compressor 4, driven by the vehicle motor or other suitable means, not shown, is adapted to supply fluid pressure to a tractor carried reservoir 5 through the medium of a conduit 6 interconnected therebetween, the fluid pressure stored in the reservoir being then conducted to the inlet chamber of a brake valve 7 through a connecting conduit 8. The brake valve 7 is not illustrated in detail but is preferably of the so-called self-lapping type and may be constructed in accordance with the principles set forth in the patent to W. A. Eaton No. 2,204,530, issued June 11, 1940. The tractor vehicle is provided with rear fluid pressure actuators or chambers 9 and front brake actuators or chambers 10, operation of the brake valve 7 by the vehicle operator serving to connect the conduit 8 with the rear brake chambers 9 through conduits 11 and 12 and with the front brake chambers 10 through conduits 13, 14 and 15 and, on reverse operation, to connect the brake chambers 9 and 10 with atmosphere to exhaust fluid pressure therefrom and release the brakes in a manner well known to those skilled in the art. In order that the trailer vehicle may also be supplied with fluid pressure from the reservoir 5 carried by the tractor, a conduit 16 connected to the reservoir serves to conduct fluid pressure to a shut off valve 17 located at the rear end of the tractor, this line constituting what is commonly known as the emergency line. A flexible hose 18 is connected to the rear of the shut off valve 17 and is adapted to be coupled to an emergency line of the trailer in a manner hereinafter described. In like manner, means are provided for conducting fluid pressure from the brake valve 7 to the braking system of the trailer by means of a conduit 19, connected to the brake valve through conduit 13 and provided with a shut off valve 20 located adjacent the rear end of the tractor, a flexible hose 21 serving to connect the valve 20 with the trailer braking system.

The trailer braking system includes an emergency reservoir 22, a plurality of fluid pressure brake actuators or cylinders 23, and a relay emergency valve 24 for controlling the degree of fluid pressure in the brake actuators 23. This latter valve, not shown in detail, is preferably constructed in accordance with principles set forth in the patent to Stephen Vorech and Wilfred A. Eaton No. 2,049,984, issued August 4, 1936, particular reference being had to Fig. 3 thereof. The emergency portion of the valve serves to permit the flow of fluid pressure from the trailer emergency line 25 to the trailer reservoir 22 through a conduit 26, while the relay portion of the valve serves, under certain conditions hereinafter to be described, to connect conduit 26 with a conduit 27, which latter conduit is connected with the trailer brake actuators 23 by means of conduits 28. The relay portion of the relay emergency valve is adapted to be controlled by fluid pressure conducted thereto through a conduit 29, this conduit being connected to the flexible hose 21 leading from the tractor through the medium of a shut off valve 30, a conduit 31, and a coupling device 32 having a section 33 carried by the trailer and a similar section 34 detachable therefrom and connected with the flexible hose 21. In like manner the trailer emergency line 25 is connected with the tractor carried hose 18 by means of a shut off valve 35, a conduit 36, and a coupling device 37 having a portion 38 connected with the conduit 36 and a similar portion 39 detachable therefrom and connected with the flexible hose 18.

When it is desired to operate the vehicle, the compressor 4, on starting of the vehicle engine, serves to supply fluid pressure to the reservoir 5 through conduit 6, and the trailer reservoir 22 is in turn supplied with fluid pressure therefrom through conduit 16, valve 17, flexible hose 18, coupling device 37, conduit 36, valve 35, conduit 25, valve mechanism 24 and conduit 26, while fluid pressure is supplied to the tractor carried brake valve 7 from the reservoir 5 by means of the conduit 8 as heretofore stated. If it is now desired to apply the brakes on the vehicles, actuation of the valve 7 by the operator serves to supply fluid pressure from the reservoir 5 to the tractor brake actuators 9 and 10 through the conduits heretofore described and likewise serves to supply fluid pressure for the control of the relay emergency valve 24 through the medium of conduits 13 and 19, valve 20, flexible hose 21, coupling device 32, conduits 31, valve 30 and conduit 29, it being understood that, on operation of the valve 7 to supply a given degree of pressure to the actuators 9 and 10 on the tractor, the valve mechanism 24 on the trailer will likewise be actuated to connect the trailer emergency reservoir 22 with the trailer brake actuators 23 through conduit 26, valve 24 and conduits 27 and 28, the pressure supplied to the trailer brake actuators from the reservoir 22 being substantially equal to that supplied to the tractor brake actuators 9 and 10 from the tractor reservoir 5.

In addition to the normal brake control operation just described, the braking system illustrated is so constructed as to provide an automatic application of the brakes on the trailer on failure of fluid pressure in the emergency line for any reason, and the coupling devices 32 and 37 are so designed that, in the event of break-away of the trailer from the tractor, the two adjacent parts of the coupling will separate without injuring or breaking the flexible connecting hose. In the event this separation of the adjacent parts of the coupling device 37 takes place, a reduction of pressure in the conduit 25 occurs, which is sufficient to actuate the emergency valve and permit the brake actuators 23 to be energized by fluid pressure from the reservoir 22, as previously described.

In view of the foregoing explanation of the operation of the braking system illustrated in Fig. 1, it will be apparent to those familiar with the braking art, that separation of the coupling members 38 and 39 on break-away of the trailer must necessarily result in a reduction of pressure in the conduit 25 if proper operation of the trailer braking system is to take place, and, with particular reference to Fig. 2 of the drawing, means have been provided for preventing the entrance of foreign matter into the coupling members when they are in disconnected position, without in any way interfering with the above described emergency operation of the brakes on separation of the coupling members, the coupling members being so constituted that, even though the entrance ports thereof are normally closed against the entrance of foreign matter, the means for closing these ports does not prevent the exhaust of fluid pressure through the port for the purpose of effecting a pressure reduction in the emergency line 25 sufficient to actuate the emergency valve mechanism and effect application of the trailer brakes.

The coupling device illustrated in Fig. 2 includes a pair of body members 50 substantially identical in form and adapted, on relative rotative movement thereof, to lock together as more fully described in the patent to C. C. Farmer, No. 1,765,576, issued June 24, 1930. Each of the members 50 is provided with a cam surface 51, and a cam surface 52 oppositely disposed and adapted, on rotative movement of the couplings, to move the coupling members toward each other. Casing 50 is adapted to be connected with the fluid pressure brake system through a port 53 connected with a chamber 54 formed in the casing, this chamber being provided with an outlet port 55 provided with a resilient ported gasket 56 suitably retained therein as by means of its engagement with a groove 57 formed in the wall of the port. The gasket is of such length as to extend beyond a surface 58 formed on the casing and is adapted in response to the operation of the cam faces 51 and 52, on rotative movement of the members, to engage the corresponding gasket in the other member in sealing engagement to prevent the escape of fluid pressure therebetween. The ported gasket is provided with a tapered bore 59 for establishing a connection between the chamber 54 of the coupling casing, and this bore is normally closed by means of a valve member 60 having a peripheral portion 61 normally urged into a position to close the outer end of the tapered bore of the gasket by means of a spring 62. An abutment 63 formed in the casing is provided with a centrally located bore 64, a valve carrying sleeve 65 being slidably mounted in this bore in a position concentric with the bore of the gasket 56. The outer end of the sleeve is provided with a flange 66 adapted to abut the inner face of the valve member and the spring 62 is interposed between this flange and the face of the abutment. The valve is provided with a stem 67 slidably mounted in a bore 68 formed in the sleeve, the result being that the spring acting on the sleeve and consequently on the valve normally urges the latter toward a position adapted to close the port in the resilient gasket 56. In order to limit the movement of the valve in this direction and to prevent its being urged beyond the outer end of the port in the gasket by the spring 62, a stop nut 69 is threadedly mounted on the inner end of the sleeve in such a manner as to abut the inner face of the abutment 63 and limit outward movement of the sleeve and valve. This construction, however, is adapted to limit the motion of the valve in one direction from the closing position only, and in order that the valve may, under certain circumstances to be hereinafter described, move in an outward direction to open the port in the gasket, a relatively light spring 70 is interposed between the inner end of the sleeve and the washer 71 carried on the valve stem and retained thereon in the position shown by means of a suitable pin 72 carried by the inner end of the valve stem.

From the foregoing description it will be apparent that the valve is positioned against inward movement by a relatively strong spring, and against outward movement by a relatively light spring, the strong spring being necessary to prevent opening of the valve when the coupling in disconnected position is dropped on the ground and comes in contact with an object which would cause this action to occur and consequently permit the entrance of dirt or other foreign substance into the interior of the coupling. As heretofore stated, however, it is essential to the proper operation of the emergency feature of the trailer brake system in the event of accidental disconnection of the members of the coupling 37 when the vehicle is proceeding along the highway, to provide means for permitting a substantial reduction of pressure in the conduit 25 under such conditions, in order that the emergency valve may be actuated to cause a brake application. Under such a condition, the chamber 54 of the coupling member attached to the trailer conduit 36 will be under considerable pressure before such break-away occurs, and this pressure acting on the inner side of the valve member is sufficient to overcome the tension of the relatively light spring 70, thus permitting the action of fluid under pressure on the valve to move the latter in an outward direction and permitting sufficient pressure to escape from the interior of the coupling, and consequently from the conduit 25, to effect the necessary operation of the emergency valve on the trailer. As soon as sufficient pressure has been exhausted from the conduit 25 and from the chamber 54 of the coupling, the spring 70 will serve to return the valve to its normal neutral position, whereupon the outlet port of the gasket is effectively closed to prevent the entrance of foreign matter which might be carried through the piping system into the various valve mechanisms.

In order that satisfactory operation of the brakes may be assured on the tractor and trailer vehicle when the couplings are in connected position, it is essential that a relatively unrestricted passage for fluid pressure exist from one coupling member to the other, and to this end means are provided, so constituted as to cause the valve members to be automatically moved into port opening position on connecting operation of the coupling members. The outer end of the valve member is accordingly provided with a rounded projecting portion 73, centrally located on the valve member so as to contact a corresponding portion of the valve in the complementary coupling member whenever the members are placed in coupled position, this coupling operation serving on engagement of the projections 73 to move the valve members inwardly against the force exerted by the springs 62 so as to move the peripheral portions 61 of the valves inwardly from the outer edge of the ports in the sealing gaskets. In order to facilitate this action, the bore of the gasket extending inwardly from the outer end of the gasket port is preferably provided with the tapered portion 59, this construction serving to lessen the valve travel, which would otherwise be necessary in order to provide adequate passage for the flow of fluid pressure between the two coupling members. While the projection on the outer end of the valve is shown as having a rounded shape, it will be understood that any shape which would tend to minimize the adherence of mud or other foreign substance to the outer face of the valve can be satisfactorily used for this purpose.

It will also be understood by those skilled in the art that it may be unnecessary as well as undesirable to so arrange the valve as to be operable in either direction from neutral position in the case of the coupling members connected to the hose lines 18 and 21, as the exhaust of fluid pressure on disconnection of the couplings is not essential in this case to satisfactory operation of the tractor brake mechanism, and may in fact, be detrimental, whereas the omission of the feature allowing the valve to open outwardly under the action of fluid pressure within the coupling, may serve to substantially prevent depletion of the air supply on the tractor vehicle. In such circumstances the relatively light spring 70 may be omitted and the valve retained against outward movement in the sleeve in the insertion of the pin 72 in a pin hole 74 suitably located in the valve stem for this purpose. Thus the valves in the forward coupling members attached to the tractor carried hose will be prevented from outward movement under the action of fluid pressure thereon and will serve to substantially prevent the escape of fluid pressure from the tractor brake system, while at the same time, connection of the forward coupling members to the rear coupling members will cause engagement of the valve projections 73 with the result that the valves will be moved inwardly to establish a relatively unrestricted path of communication between the tractor and trailer brake systems, thus permitting satisfactory operation of the brake mechanism. It will also be understood, that if deemed desirable, the pin hole 74 may be so located as to permit the washer 71 to be interposed on the valve stem between the inner end of the sleeve 65 and the pin 72 inserted in pin hole 74. Thus the novel mechanism shown may be readily adapted to required types of service, merely by utilizing the form shown, or by omitting the spring and moving the pin 72 to a new location to obtain the desirable results above described.

It will be seen from the foregoing description that coupling devices constructed as illustrated will effectively prevent the entrance of dirt and other foreign substances into the vital parts of the braking system, and furthermore, that these coupling devices in the various forms shown may be combined in any desired manner in the various lines between the tractor and the trailer so as to provide for the most efficient operation of the brake system under all operating conditions.

While one particular embodiment of the invention has been extensively illustrated and described, it is to be expressly understood that the invention is in no way limited thereby and that various changes and modifications may be made therein without departing from the scope of the invention, for the limits of which reference should be had to the appended claims.

What is claimed is:

1. In each of two hose coupling members for a fluid pressure brake system, in combination, an inlet port, a chamber communicating with said port, an outlet port in said chamber provided with a resilient ported gasket, a valve member cooperating with said gasket to normally close said gasket port, said valve member being adapted to move inwardly to allow passage of fluid pressure through said gasket port upon completion of hose coupling, an abutment including a centrally located bore formed in said chamber, a sleeve slidably mounted in said bore, a valve stem of said valve slidably mounted in said sleeve and extending beyond the end of said sleeve, a flange on one end of said sleeve adapted to abut the inner face of said valve member, a spring mounted upon and surrounding said sleeve, said spring being interposed between said flange and said abutment, means mounted upon said sleeve for limiting the outer movement of said sleeve whereby said valve is normally urged to a position closing the port of said gasket, and means mounted upon said valve stem whereby said valve is allowed to move outwardly beyond said gasket upon uncoupling of said hose coupling members to first allow pressure to be exhausted from said chamber and then to return to a position coincident with said gasket to close the port in said gasket.

2. In each of two hose coupling members for a fluid pressure brake system, in combination, an inlet port, a chamber communicating with said port, an outlet port in said chamber provided with a resilient ported gasket, a valve member cooperating with said gasket to normally close said gasket port, said valve member including a valve stem and being adapted to move inwardly past said gasket to allow passage of fluid pressure through said gasket port upon completion of hose coupling, an abutment including a centrally located bore formed in said chamber, a sleeve slidably mounted in said bore, said valve stem being slidably mounted in said sleeve and extending inwardly beyond the end of said sleeve, a flange on one end of said sleeve adapted to abut the inner face of said valve member, a relatively heavy spring mounted upon said sleeve, said spring being interposed between said flange and said stationary abutment whereby said valve is normally urged to a position to close said gasket port, a stop nut mounted on said sleeve cooperating with the inner face of said abutment to limit the outer movement of said sleeve, a washer mounted on said valve stem, and a relatively light spring mounted upon said valve stem, said spring being interposed between said washer and the inner end of said sleeve whereby said valve may move outwardly beyond said gasket port in response to fluid pressure to first allow exhaust of fluid pressure from said chamber and then to return to a position coincident with said gasket port upon uncoupling of said hose coupling members.

3. In combination in a pair of hose coupling members for a fluid pressure brake system, a pair of inlet ports, chambers communicating with said ports, an outlet port in each of said chambers provided with a resilient ported gasket, valve members including valve stems cooperating with said gaskets to normally close said gasket ports, said valve members being adapted to move inwardly to allow passage of fluid pressure through said gasket ports upon coupling of said coupling members, an abutment including a centrally located bore formed in each of said chambers, a sleeve slidably mounted in each bore, a valve stem of each valve member mounted in each of said sleeves, said stems extending inwardly beyond the end of each sleeve, one of said valve stems having a bore extending transversely through said stem, said bore being located adjacent the inner end of said sleeve, a pin extending through said bore whereby outward movement of said valve is prevented, a flange on each of said sleeves adapted to abut the inner face of said valve members, a relatively heavy spring mounted upon each sleeve, said springs being interposed between said flange and abutment whereby each valve is normally urged to a position closing said gasket ports, a stop nut mounted on each sleeve to limit the outward movement of each sleeve, a washer mounted on the opposite valve stem, a relatively light spring mounted on said valve stem, said spring being interposed between said washer and the inner end of the sleeve mounted on said stem, whereby said valve may move outwardly beyond the gasket cooperating with said valve to allow exhaust of fluid pressure upon uncoupling the hose coupling members and then return to a position closing the port in said gasket.

4. In a hose coupling member for a fluid pressure brake system, in combination, an inlet port, a chamber communicating with said port, an outlet provided with a ported gasket, a valve cooperable with said gasket, an abutment having a bore formed in said chamber, a sleeve slidably mounted in said bore, a valve stem slidably mounted in said sleeve, resilient means normally urging said sleeve in an outward direction, means limiting the outer movement of said sleeve whereby said valve is normally retained in cooperation with said gasket, and means cooperable with said valve stem allowing said valve to move outwardly beyond said gasket in response to fluid pressure in said chamber upon uncoupling of said coupling member.

5. In a hose coupling member for a fluid pressure brake system, in combination, an inlet port, a chamber communicating with said port, an outlet provided with a ported gasket, a valve cooperable with said gasket, an abutment including a bore formed in said chamber, a sleeve slidably mounted in said bore, a valve stem slidably mounted in said sleeve, resilient means cooperable with said sleeve and abutment to normally urge said valve in an outward direction, means limiting the outer movement of said sleeve whereby said valve is normally retained in cooperation with said gasket, and means cooperable with said valve stem allowing said valve to move outwardly beyond said gasket in response to fluid pressure in said chamber upon uncoupling of said hose coupling member.

6. In a hose coupling member for a fluid pressure brake system, in combination, an inlet port, a chamber communicating with said port, an outlet provided with a resilient ported gasket, a valve cooperable with said gasket, an abutment having a bore formed in said chamber, a sleeve slidably mounted in said bore, a valve stem slidably mounted in said sleeve, resilient means normally urging said sleeve in an outward direction, means cooperable with said abutment limiting the outer movement of said sleeve whereby said valve is normally retained in cooperation with said gasket, and means cooperable with said valve stem allowing said valve to move outwardly beyond said gasket in response to fluid pressure in said chamber upon uncoupling of said hose coupling member.

7. In a hose coupling member for a fluid pressure brake system, in combination, an inlet port, a chamber communicating with said port, an outlet provided with a ported gasket, a valve cooperable with said gasket, an abutment including a bore formed in said chamber, a sleeve slidably mounted in said bore, a valve stem slidably mounted in said sleeve, resilient means cooperable with said sleeve and abutment to normally urge said valve in an outward direction, means cooperable with said abutment limiting the outer movement of said sleeve whereby said valve is normally retained in cooperation with said gasket, and means cooperable with said valve stem allowing said valve to move outwardly beyond said gasket in response to fluid pressure in said chamber upon uncoupling of said hose coupling member.

8. In a hose coupling member for a fluid pressure brake system, in combination, an inlet port, a chamber communicating with said port, an outlet provided with a ported gasket, a valve cooperable with said gasket, an abutment having a bore formed in said chamber, a sleeve slidably mounted in said bore, a valve stem slidably mounted in said sleeve, resilient means normally urging said sleeve in an outward direction, means limiting the outer movement of said sleeve whereby said valve is normally retained in cooperation with said gasket, and means cooperable with said valve stem allowing said valve to move outwardly beyond said gasket in response to fluid pressure in said chamber, and to cause said valve to move inwardly to contact said gasket upon exhaust of said fluid pressure upon uncoupling of said hose coupling member.

9. In a hose coupling member for a fluid pressure brake system, in combination, an inlet port, a chamber communicating with said port, an outlet provided with a ported gasket, a valve cooperable with said gasket, an abutment including a bore formed in said chamber, a sleeve slidably mounted in said bore, a valve stem slidably mounted in said sleeve, resilient means cooperable with said sleeve and abutment to normally urge said valve in an outward direction, means limiting the outer movement of said sleeve whereby said valve is normally retained in cooperation with said gasket, and means cooperable with said valve stem allowing said valve to move outwardly beyond said gasket in response to fluid pressure in said chamber and to cause said valve to move inwardly to contact said gasket upon exhaust of said fluid pressure whenever said hose coupling member is uncoupled.

10. In a hose coupling member for a fluid pressure brake system, in combination, an inlet port, a chamber communicating with said port, an outlet provided with a ported gasket, a valve cooperable with said gasket, an abutment having a bore formed in said chamber, a sleeve slidably mounted in said bore, a valve stem slidably mounted in said sleeve, resilient means normally urging said sleeve in an outward direction, means cooperable with said abutment limiting the outer movement of said sleeve whereby said valve is normally retained in cooperation with said gasket, and means cooperable with said valve stem allowing said valve to move outwardly beyond said gasket in response to fluid pressure in said chamber and to cause said valve to move inwardly to contact said gasket upon exhaust of said fluid pressure whenever said hose coupling member is uncoupled.

11. In a hose coupling member for a fluid pressure brake system, in combination, an inlet port, a chamber communicating with said port, an outlet provided with a ported gasket, a valve cooperable with said gasket, an abutment including a bore formed in said chamber, a sleeve slidably mounted in said bore, a valve stem slidably mounted in said sleeve, resilient means cooperable with said sleeve and abutment to normally urge said valve in an outward direction, means cooperable with said abutment limiting the outer movement of said sleeve whereby said valve is normally retained in cooperation with said gasket, and means cooperable with said valve stem allowing said valve to move outwardly beyond said gasket in response to fluid pressure in said chamber and to cause said valve to move inwardly to contact said gasket upon exhaust of said fluid pressure whenever said hose coupling member is uncoupled.

WILFRED A. EATON.